United States Patent
Anderson et al.

(10) Patent No.: US 8,660,761 B2
(45) Date of Patent: Feb. 25, 2014

(54) METHOD OF EFFECTING SIMULTANEOUS DISPLACEMENT CHANGES IN HYDROSTATIC DRIVE MACHINE

(75) Inventors: Randall Todd Anderson, Peoria, IL (US); Bradley John Will, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 145 days.

(21) Appl. No.: 13/303,324

(22) Filed: Nov. 23, 2011

(65) Prior Publication Data
US 2013/0131937 A1    May 23, 2013

(51) Int. Cl.
*B60K 17/10*    (2006.01)
*F16H 61/04*    (2006.01)

(52) U.S. Cl.
USPC ............ 701/51; 701/66; 60/445; 477/68

(58) Field of Classification Search
None
See application file for complete search history.

(56) References Cited

U.S. PATENT DOCUMENTS

| | | | |
|---|---|---|---|
| 4,236,596 A * | 12/1980 | Abels | 180/307 |
| 5,582,007 A * | 12/1996 | Coutant et al. | 60/327 |
| 7,247,122 B2 | 7/2007 | Shah | |
| 7,958,725 B2 | 6/2011 | Elliott | |
| 7,971,434 B2 | 7/2011 | Ishizaki et al. | |
| 2006/0150624 A1 | 7/2006 | Shah | |
| 2011/0015022 A1 | 1/2011 | Stoeckl et al. | |

FOREIGN PATENT DOCUMENTS

| | | |
|---|---|---|
| JP | 62278365 | 12/1987 |
| JP | 08108769 | 4/1996 |

* cited by examiner

*Primary Examiner* — Michael J Zanelli
(74) *Attorney, Agent, or Firm* — Liell & McNeil; Kelly Smith

(57) ABSTRACT

A method is provided for controlling a gear ratio change in a hydrostatic drive machine. The hydrostatic drive machine includes a variable displacement pump and at least one variable displacement motor fluidly connected with the variable displacement pump. The method includes a step of determining a gear ratio rate of change corresponding to a change from a current gear ratio to a new gear ratio. Start and stop overlap gear ratios corresponding to the gear ratio rate are determined and define an overlap range. The current gear ratio is changed to the new gear ratio using electronic signals at least in part by simultaneously changing displacements of the variable displacement pump and the at least one variable displacement motor at gear ratios within the overlap range, and sequentially changing displacements of the variable displacement pump and the at least one variable displacement motor at gear ratios outside the overlap range.

16 Claims, 4 Drawing Sheets

| | | | | | | | | | | |
|---|---|---|---|---|---|---|---|---|---|---|
| GR Rate | 0.05 | 0.07 | 0.11 | 0.15 | 0.19 | 0.23 | 0.28 | 0.32 | 0.36 | 0.4 |
| Pump Ratio | 0.95 | 0.9 | 0.8 | 0.7 | 0.6 | 0.5 | 0.4 | 0.3 | 0.2 | 0.1 |
| Motor Ratio | 0.8 | 0.7 | 0.6 | 0.53 | 0.5 | 0.48 | 0.46 | 0.445 | 0.425 | 0.4 |

METHOD OF EFFECTING SIMULTANEOUS DISPLACEMENT CHANGES IN HYDROSTATIC DRIVE MACHINE

TECHNICAL FIELD

The present disclosure relates generally to a control system and method for a hydrostatic drive machine, and more particularly to a control system and method for effecting simultaneous displacement changes in the hydrostatic drive machine.

BACKGROUND

Many machines, including off-highway machines, are known to use hydrostatic drive systems to drive the ground engaging elements, such as wheels or tracks, of the machine. Such hydrostatic drive systems commonly include at least one pump driven by a prime mover, such as an internal combustion engine, of the machine. The pump may be configured to drive one or more sets of motors, which, in turn, power the ground engaging elements of the machine. The pump, and/or motors, may provide variable displacement, such that a fluid flow between the components of the hydrostatic drive system may be adjusted while the machine is running. As a result, direction, speed, and torque of the drive wheels may be continuously varied.

During a typical work cycle, an operator may choose to quickly change the direction, speed, and/or torque, as permitted by the hydrostatic drive system, in order to maximize efficiency in performance of the work cycle. For example, an operator may wish to drive toward a pile of materials at maximum speed, pick up a load of the materials, and quickly reverse away from the pile in order to transport the load to a new location. However, if the operator commands the hydrostatic drive system to accelerate, decelerate, or change directions too quickly, the components of the hydrostatic drive system may not be capable of suck quick transitions and, as a result, the machine may jerk or lug. This sacrifice of smoothness for speed may result in a reduction of efficiency caused by, for example, discomfort and fatigue of the operator and/or spilling a portion of the load. Thus, operators may desire a balance of quick responsiveness of the hydrostatic drive system with smoothness in transitions of the hydrostatic drive system.

U.S. Pat. No. 7,958,725 to Elliott teaches a method for effecting simultaneous displacement changes in a hydrostatic drive system. The method includes determining a total displacement change required for rotary fluid actuators of the hydrostatic drive system to produce a desired gear ratio change. If the total displacement change is above a predetermined threshold, displacements of the rotary fluid actuators are simultaneously changed. However, if the total displacement change is below a predetermined threshold, the displacements of the rotary fluid actuators are sequentially changed.

The present disclosure is directed to one or more of the problems or issues set forth above.

SUMMARY OF THE DISCLOSURE

In one aspect, a method is provided for controlling a gear ratio change in a hydrostatic drive machine. The hydrostatic drive machine includes a variable displacement pump and at least one variable displacement motor fluidly connected with the variable displacement pump. The method includes a step of determining a gear ratio rate of change corresponding to a change from a current gear ratio to a new gear ratio. Start and stop overlap gear ratios corresponding to the gear ratio rate are determined and define an overlap range. The current gear ratio is changed to the new gear ratio using electronic signals at least in part by simultaneously changing displacements of the variable displacement pump and the at least one variable displacement motor at gear ratios within the overlap range, and sequentially changing displacements of the variable displacement pump and the at least one variable displacement motor at gear ratios outside the overlap range.

In another aspect, a hydrostatic drive machine includes ground engaging propulsion elements coupled with a machine frame, and an internal combustion engine supported on the machine frame. A variable displacement pump is coupled with the internal combustion engine, and at least one variable displacement motor for driving the ground engaging propulsion elements is fluidly connected with the variable displacement pump. An electronic controller is in communication with the operator input device, the variable displacement pump, and the at least one variable displacement motor. The electronic controller determines a gear ratio rate of change corresponding to a change from a current gear ratio to a new gear ratio, and determines start and stop overlap gear ratios corresponding to the gear ratio rate of change. The current gear ratio is changed to the new gear ratio using electronic signals at least in part by simultaneously changing displacements of the variable displacement pump and the at least one variable displacement motor at gear ratios within an overlap range defined by the start and stop overlap gear ratios, and sequentially changing displacements of the variable displacement pump and the at least one variable displacement motor at gear ratios outside the overlap range.

DETAILED DESCRIPTION

Figure 1:
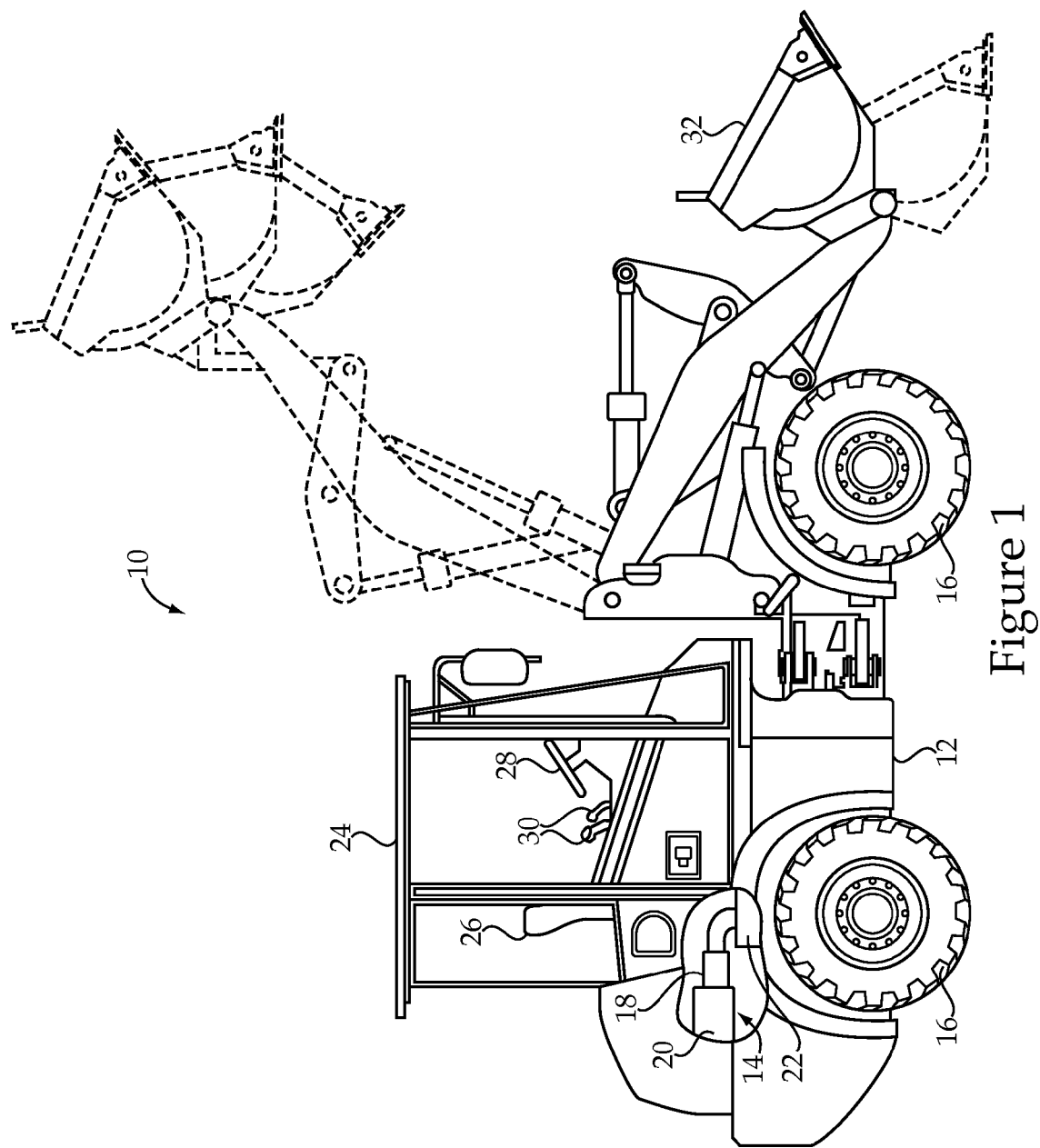
FIG. 1 is a side diagrammatic view of a hydrostatic drive machine, according to the present disclosure.

An exemplary embodiment of a machine 10 is shown generally in FIG. 1. The machine 10 may be a wheel loader, as shown, or any other off-highway or on-highway vehicle having a hydrostatic drive system. As such, machine 10 may also be referenced herein as a hydrostatic drive machine or, more specifically, a hydrostatic drive wheel loader. In the illustrated embodiment, machine 10 generally includes a frame 12 having a hydrostatic drive system 14 supported thereon for driving ground engaging elements 16, such as wheels (shown) or tracks, of the machine 10. A strategy presented herein for controlling the hydrostatic drive system 14 may be widely applicable to any hydrostatic drive machine and, therefore, it should be appreciated that the specific embodiments provided are presented for exemplary purposes only.

The hydrostatic drive system 14 may generally include at least one pump 18, such as a hydraulic pump, driven by a prime mover, such as a compression or spark-ignited internal combustion engine 20 or electric motor, of the machine 10. The pump 18 may be configured to drive at least one motor 22, such as one or more sets of hydraulic motors, which, in turn, power the ground engaging elements 16 of the machine 10. Each of the pump 18 and motor 22 may provide variable displacement, such that a fluid flow between the components of the hydrostatic drive system 14 may be adjusted while the machine 10 is running. As a result, direction, speed, and torque of the ground engaging elements 16, or wheels, may be continuously varied.

An operator control station 24 may also be supported on the frame 12 and may include various controls and devices that may be used by an operator of the machine 10. For example, the operator control station 24 may include known devices, such as a seat assembly 26, a steering device 28, and one or more machine operation controllers 30. According to a specific example, a first machine operation controller 30 may be provided for controlling directional movement of the machine 10, while a second machine operation controller 30 may be provided for controlling operation of an implement 32, such as a bucket, of the machine 10. The operator control station 24 may include additional machine operation controllers 30 for controlling, among other operational aspects, any or all of engine speed, machine speed, gear ratio, and rim pull.

Figure 2:
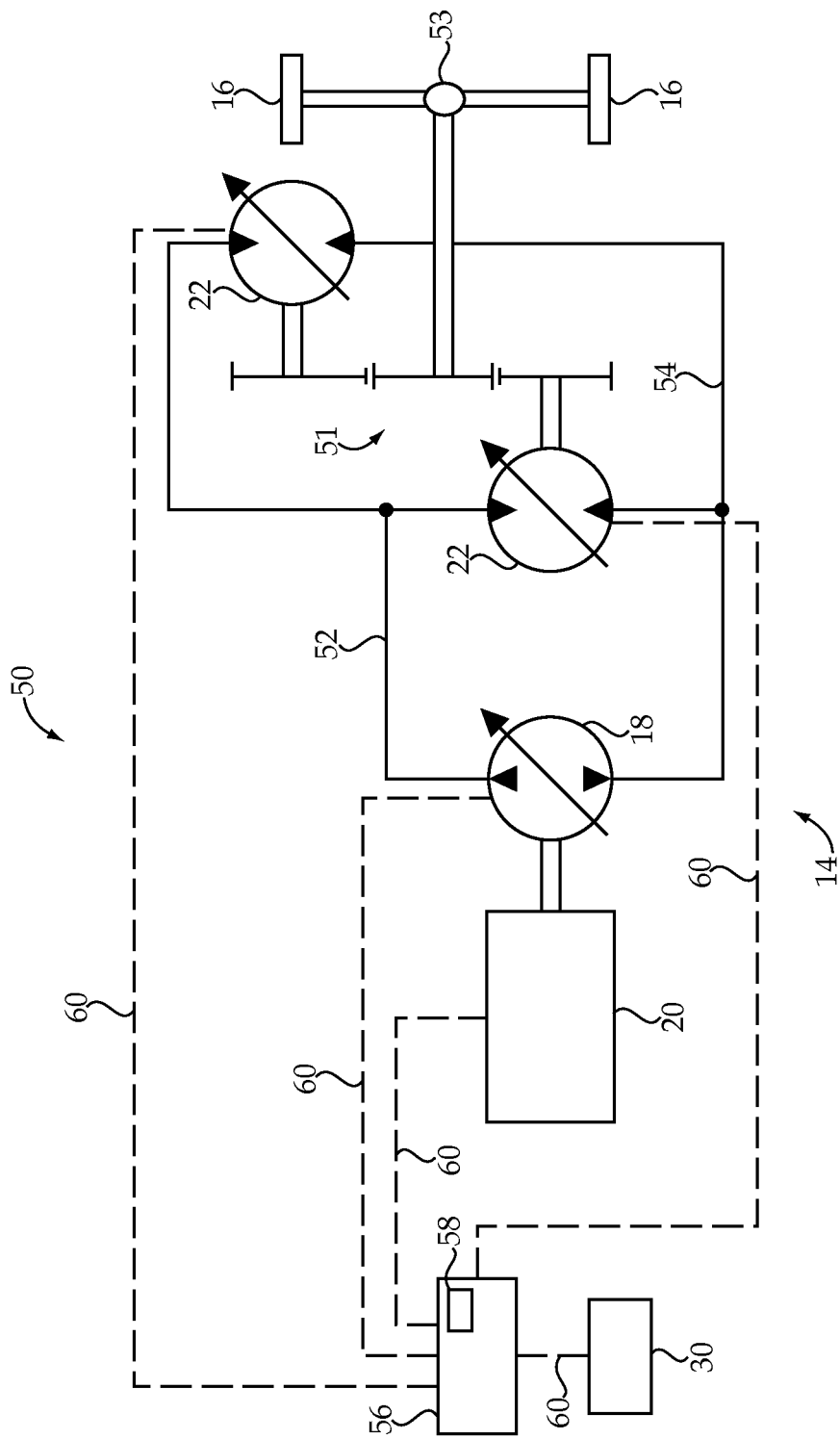
FIG. 2 is a schematic of a hydrostatic drive system of the hydrostatic drive machine of FIG. 1, according to one embodiment of the present disclosure.

A specific embodiment of the hydrostatic drive system 14 is shown in FIG. 2 to further describe a control system 50 of the hydrostatic drive machine 10. As shown, the hydrostatic drive system 14 may include at least one variable displacement pump 18 mechanically coupled to the internal combustion engine 20. The variable displacement pump 18 may include a bi-directional variable displacement swash plate pump, such that adjustment of the swash plate of the pump 18 may adjust the displacement thereof. It should be appreciated that the term "bi-directional" may refer to a pump that is capable of pumping fluid, such as hydraulic fluid, in either of two directions. As such, the angle of the swash plate may vary between first, or positive, displacement orientations, such as for forward travel of the machine 10, and second, or negative, displacement orientations, such as for reverse travel of the machine 10. It should be appreciated that a zero displacement, or swash plate angle of zero, may result in the pump 18 displacing no fluid while rotating and, thus, not driving the machine 10.

According to the exemplary embodiment, the variable displacement pump 18 may be fluidly coupled, such as in parallel, to a pair of variable displacement motors 22. It should be appreciated that the fluid coupling of the variable displacement motors 22 to the variable displacement pump 18 may allow the relative swash plate angle of the pump 18 to determine the direction and flow rate of the hydraulic fluid that is pumped to each motor 22. In addition, the displacements of the motors 22 may be similarly varied, by adjusting swash plate angles, between minimum and maximum displacements to adjust a torque delivered to the ground engaging elements 16. The motors 22, as should be appreciated, may not be bi-directional, as described with reference to the pump 18. However, bi-directional motors may also be used without deviating from the scope of the present disclosure.

As shown, each of the variable displacement motors 22 may be drivingly coupled with one of the ground engaging elements 16. More specifically, each of the variable displacement motors 22 may be configured to drive an axle shaft, which, in turn, may be configured to drive a gear mechanism 51. The gear mechanism 51 may be drivingly coupled with the ground engaging elements 16 through a differential 53. Therefore, pumping hydraulic fluid from the variable displacement pump 18 to the variable displacement motors 22 through a first set of fluid lines 52 may drive the ground engaging elements 16 in a first, or forward, direction. The speed and torque, as should be appreciated, may be dependent upon the selected displacements of the respective pump 18 and motors 22. Pumping fluid in the opposite direction, through a second set of fluid lines 54, may drive the ground engaging elements 16 in a second, or reverse, direction at a speed and torque determined by the displacements of the pump 18 and motors 22. More specifically, adjusting the variable displacement pump 18 between a positive orientation for a first fluid flow direction and a negative orientation for an opposite fluid flow direction may control the forward or reverse direction of the machine 10.

The control system 50, referenced above, may include at least one electronic controller 56 configured to control operation of the hydrostatic drive system 14. As such, the electronic controller 56 may also be referenced herein as a drive system electronic controller. Although a single electronic controller 56 is described, it should be appreciated that the control system 50 may include a plurality of electronic controllers. For example, an additional electronic controller may be provided for controlling operation of the internal combustion engine 20. As such, each electronic controller of the control system 50 may be configured to communicate laterally and/or in a hierarchical manner. Therefore, it should be appreciated that a variety of control systems 50, ranging from simple to complex, are contemplated for use with the present disclosure.

The electronic controller 56 may be of standard design and may include a processor, such as, for example, a central processing unit, a memory 58, and an input/output circuit that facilitates communication internal and external to the electronic controller 56. The processor may control operation of the electronic controller 56 by executing operating instructions, such as, for example, computer readable program code stored in memory 58, wherein operations may be initiated internally or externally to the electronic controller 56. A control scheme, an example of which is provided below, may be utilized that monitors outputs of systems or devices, such as, for example, sensors, actuators, or control units, via the input/output circuit to control inputs to various other systems or devices.

The memory 58 may comprise temporary storage areas, such as, for example, cache, virtual memory, or random access memory, or permanent storage areas, such as, for example, read-only memory, removable drives, network/internet storage, hard drives, flash memory, memory sticks, or any other known volatile or non-volatile data storage devices. Such devices may be located internally or externally to the electronic controller 56. One skilled in the art will appreciate that any computer based system or device utilizing similar components for controlling the components of the hydrostatic drive system 14, is suitable for use with the present disclosure.

According to the exemplary embodiment, the electronic controller 56 may be in communication with at least the variable displacement pump 18 and the variable displacement motors 22. More specifically, for example, the electronic controller 56 may be in communication with the variable displacement pump 18 to adjust the swash plate angle thereof, resulting in the variable displacement described above.

According to one embodiment, a pump displacement solenoid, such as a proportional solenoid, may be provided for varying the swash plate angle and controlling the direction of fluid flow. However, various means for adjusting displacement and fluid flow are known and may be incorporated into the present disclosure. Accordingly, the electronic controller 56 may issue pump displacement commands and/or additional commands, via wired or wireless communication lines 60, to the variable displacement pump 18 to effectively control the displacement and direction of fluid flow of the variable displacement pump 18.

Similarly, the electronic controller 56 may be in communication with the variable displacement motors 22 to adjust angles of the swash plates of the motors 22. Specifically, the electronic controller 56 may issue motor displacement commands via communication lines 60 to control the displacement of the respective variable displacement motors 22. Controlling the displacement of the variable displacement motors 22, using proportional solenoids or other similar devices, may allow for further speed adjustment and/or torque adjustment, as necessary to propel the hydrostatic drive machine 10. As stated above, devices for controlling displacement and fluid flow are generally known and, therefore, will not be discussed herein in greater detail.

The electronic controller 56 may also be in communication with the internal combustion engine 20 to control a speed thereof, such as, for example, by issuing control commands via communication lines 60 to control fueling to the internal combustion engine 20. The engine speed may be adjusted, at least in part, based on one of the machine operation controllers 30. Thus, the electronic controller 56 may also communicate with the machine operator controllers 30 via communication lines 60 to detect positions, such as actuation amounts, of the machine operation controllers 30. These detected positions, along with additional inputs, may be used by the electronic controller 56 to control the internal combustion engine 20, the components of the hydrostatic drive system 14, and, ultimately, the ground speed of the hydrostatic drive machine 10. It should be appreciated that the control system 50 may include additional components and devices and may monitor additional inputs to control the hydrostatic drive system 14 as described herein.

Figures 3, 4:
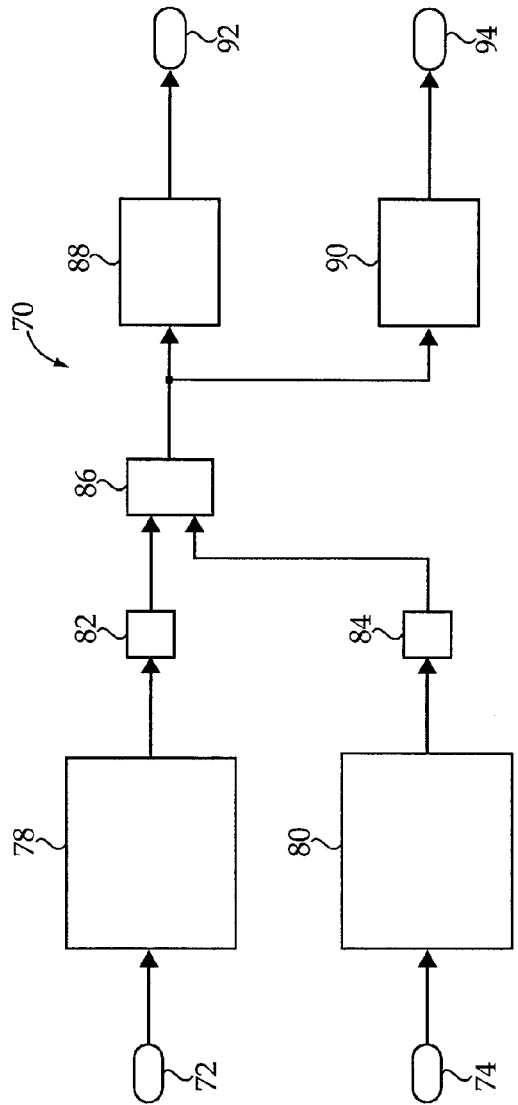
FIG. 3 is a logic flow diagram of one embodiment of a method for controlling a gear ratio change in the hydrostatic drive machine of FIG. 1, according to one aspect of the present disclosure.
FIG. 4 is a chart of start and stop overlap displacement factors corresponding to various gear ratio rates of change, according to another aspect of the present disclosure.

Turning to FIG. 3, there is shown a software logic diagram 70 representing an exemplary method for controlling a gear ratio change in the hydrostatic drive machine 10 according to the present disclosure. The method may be implemented by the control system 50 of the machine 10. According to one example, the steps implementing the disclosed method may be in the form of computer readable program code stored in the memory 58 and executed by a processor of the electronic controller 56, or other computer usable medium. The method may run continuously or may be initiated in response to a predetermined event. According to one embodiment, the method may be initiated in response to a detected movement of one or more machine operation controllers 30.

The method receives as inputs a desired gear ratio 72 and a commanded gear ratio 74. The desired gear ratio 72 may generally represent a new gear ratio desired by the operator. For example, the operator may indicate a desire to increase or decrease the current gear ratio of the hydrostatic drive system 14 to a new gear ratio by manipulating one or more of the machine operation controllers 30. As used herein, a "gear ratio" of the hydrostatic drive system 14 may represent a ratio of pump displacement to motor displacement. The desired gear ratio 72 may be adjusted based on a maximum allowed gear ratio, which may represent a fixed value set by the operator, and, further, may be limited based on any desired rate limiting strategies. The commanded gear ratio 74, however, may represent the effective gear ratio being provided by the hydrostatic drive system 14. As should be appreciated, the commanded gear ratio 74 may differ from the desired gear ratio 72, such as, for example, when power from the internal combustion engine 20 is limited.

Each of the desired gear ratio 72 and the commanded gear ratio 74 is fed into a respective derivative box 78 or 80. Each derivative box 78 and 80 calculates a filtered derivative of the respective desired gear ratio 72 and commanded gear ratio 74 to arrive at gear ratio rates of change. The absolute value of each of the desired gear ratio rate of change and the commanded gear ratio rate of change is determined at box 82 or box 84 and passed into a comparison box 86. At box 86, a smaller rate of the absolute values of the desired gear ratio rate of change and the commanded gear ratio rate of change is selected. The smaller gear ratio rate of change is then used at box 88 to select a start overlap pump displacement factor from an electronically stored overlap displacement factors map, which will be discussed below with reference to FIG. 4. The smaller gear ratio rate of change is also used at box 90 to select a stop overlap motor displacement factor from the overlap displacement factors map. The start overlap pump displacement factor 92 and stop overlap motor displacement factor 94 are provided as outputs and are used to calculate start and stop overlap gear ratios, which ultimately define an overlap range, as described below.

Turning now to FIG. 4, an exemplary chart, or map, 100 of overlap displacement factors is shown. The chart 100 includes start overlap pump displacement factors 102 and stop overlap motor displacement factors 104, which may be provided in displacement percentages as described below, corresponding to various gear ratio rates of change 106, which may be provided in gear ratio change per second. The chart 100 may be stored in memory 58 and may contain values selected to provide desired performance characteristics, as will be described in further detail below. Such values may be arrived at through testing and, further, may be provided by a manufacturer. According to the exemplary embodiment, the start overlap pump displacement factor 102 may be used to determine a start of overlap pump displacement at which to begin overlap, while the stop overlap motor displacement factor 104 may be used to determine an end of overlap motor displacement at which to stop overlap.

For example, referring to a first column 108 of the chart 100, for a gear ratio rate of change of 0.05, the start overlap pump displacement factor 102 is 0.95 and may be used to determine a start of overlap pump displacement for starting the overlap. Thus, 0.95 may be multiplied by a maximum pump displacement value for the variable displacement pump 18 to determine a pump displacement at which overlap should begin. As used herein, "overlap" refers to the simultaneous displacement changes, or stroking, of the variable displacement pump 18 and the one or more variable displacement motors 22. The stop overlap motor displacement factor 104, for the 0.05 gear ratio rate of change, is 0.8 and may be used to determine an end of overlap motor displacement for stopping the overlap. Thus, 0.8 may be multiplied by a maximum motor displacement value for the variable displacement motors 22 to determine a motor displacement at which overlap should stop. Of course, alternative means for determining the start and stop overlap displacements may also be used without deviating from the scope of the present disclosure.

Figure 5:
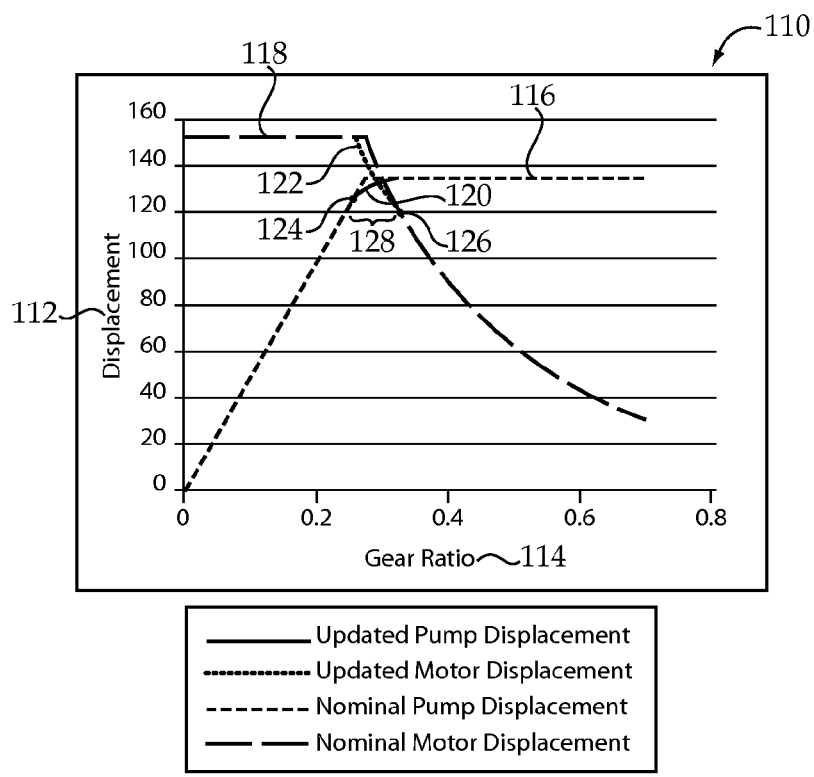
FIG. 5 is a graph depicting a first exemplary overlap range corresponding to a first gear ratio rate of change, according to another aspect of the present disclosure.

The start and stop overlap displacement factors 92 and 94 are used to define an overlap range, within the course of a gear ratio change, during which the displacements of the variable displacement pump 18 and the variable displacement motors 22 are simultaneously changed. A first exemplary overlap range corresponding to a first gear ratio rate of change is shown in FIG. 5. Specifically, FIG. 5 depicts a graph 110 of displacement 112 versus gear ratio 114. A nominal curve 116 representing conventional displacement adjustment for the variable displacement pump 18 for an increase in gear ratio from a stationary position of the hydrostatic drive machine 10 is shown, along with a nominal curve 118 representing conventional displacement adjustment of the variable displacement motors 22. Specifically, according to a conventional increase in gear ratio from a stationary position, the pump displacement may be stroked from zero displacement to maximum displacement while the motor displacement is maintained at maximum displacement. To further increase speed, the motor displacement may then be stroked from maximum displacement to zero displacement. Such conventional displacement changes may be described as sequential.

The graph 110 also shows an updated curve 120 representing displacement adjustment for the variable displacement pump 18 and an updated curve 122 representing displacement adjustment for the variable displacement motors 22 for a 0.05 gear ratio rate of change. Specifically, for the 0.05 gear ratio rate of change, which may represent a smaller rate of a desired gear ratio rate of change and a commanded gear ratio rate of change, a start overlap pump displacement 124 and a stop overlap motor displacement 126 corresponding to the 0.05 gear ratio rate of change may be determined based on the displacement factors selected from memory 58. For example, the start and stop overlap displacements 124 and 126 may be calculated using the start overlap pump displacement factor 102 and stop overlap motor displacement factor 104 from the chart 100 of FIG. 4 and a maximum pump displacement and a maximum motor displacement, as described above. In other words, a maximum pump displacement value for the variable displacement pump 18 is scaled by the start overlap pump displacement factor 102 corresponding to the 0.05 gear ratio rate of change to arrive at a start of overlap pump displacement at which to begin overlap. A maximum motor displacement value for one or both of the variable displacement motors 22 is scaled by the stop overlap motor displacement factor 104 corresponding to the 0.05 gear ratio rate of change to arrive at an end of overlap motor displacement at which to stop overlap.

According to the exemplary embodiment, the start overlap pump displacement 124 for a 0.05 gear ratio rate of change may be 0.95 times a maximum pump displacement, while the stop overlap motor displacement 126 may be 0.8 times a maximum motor displacement value. The start and stop overlap displacements 124 and 126 may ultimately define start and stop overlap gear ratios which, in turn, define an overlap range 128, during which the variable displacement pump 18 and variable displacement motors 22 are simultaneously stroked. For gear ratios outside the overlap range 128, the displacements of the variable displacement pump 18 and variable displacement motors 22 are sequentially changed, as reflected in the graph 110.

Figure 6:
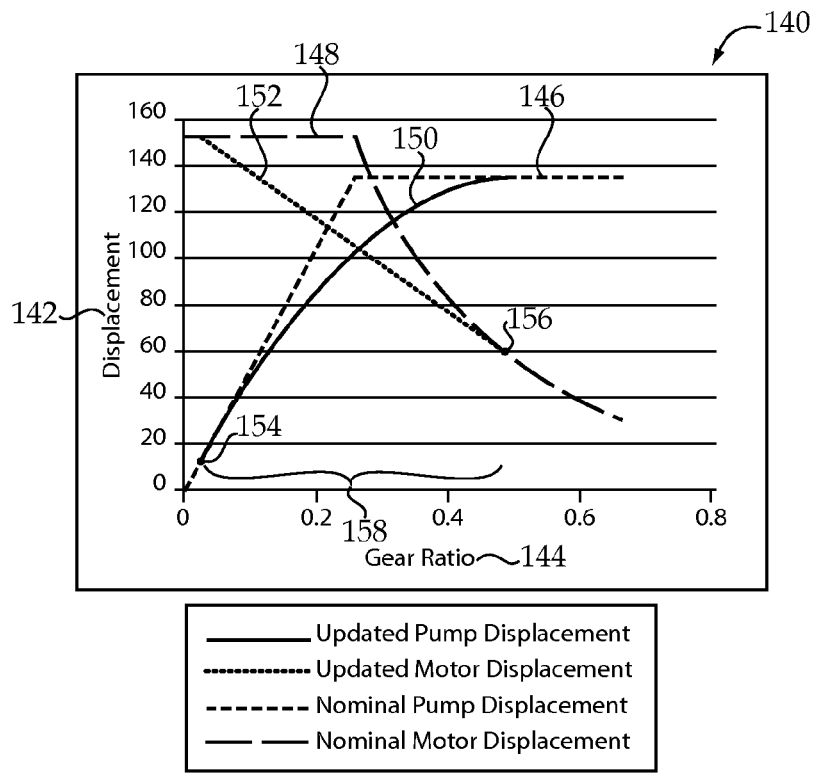
FIG. 6 is a graph depicting a second exemplary overlap range corresponding to a second gear ratio rate of change, according to another aspect of the present disclosure.

Turning now to FIG. 6, a graph 140 of displacement 142 versus gear ratio 144 for a higher gear ratio rate of change, i.e., a rate of change of 0.40, is shown. Graph 140 also includes nominal curves 146 and 148, similar to nominal curves 116 and 118 of graph 110, representing conventional displacement adjustments for the variable displacement pump 18 and variable displacement motors 22 effecting a gear ratio increase from zero, or a stationary position. The graph 140 also shows an updated curve 150 representing displacement adjustment for the variable displacement pump 18 and an updated curve 152 representing displacement adjustment for the variable displacement motors 22 for a 0.40 gear ratio rate of change. Specifically, for the 0.40 gear ratio rate of change, a start of overlap pump displacement 154 and an end of overlap motor displacement 156 corresponding to the 0.40 gear ratio rate of change may be determined. For example, the start and end of overlap displacements 154 and 156 may be calculated based on the displacement factors 102 and 104 from the chart 100 of FIG. 4 along with a maximum pump displacement and a maximum motor displacement.

According to the exemplary embodiment, the start overlap pump displacement 154 for a 0.40 gear ratio rate of change may be 0.10 times a maximum pump displacement, while the stop overlap motor displacement 156 may be 0.4 times a maximum motor displacement value. The start and stop overlap displacements 154 and 156 correspond to gear ratios which define an overlap range 158, during which the variable displacement pump 18 and variable displacement motors 22 are simultaneously stroked. For gear ratios outside the overlap range 158, the displacements of the variable displacement pump 18 and variable displacement motors 22 are sequentially changed, as reflected in the graph 140. As shown in FIG. 4, the overlap displacement factors map 100 may include start and stop overlap displacement factors 102 and 104 that correspond to overlap gear ratio ranges that increase as the gear ratio rate of change 106 increases. Thus, as shown in FIGS. 5 and 6, overlap ranges may be broader for higher gear ratio rates of change. As should be appreciated, the chart may simply include start and stop gear ratios, or ratios of maximum displacement, and, according to those embodiments, may not require the calculation described herein to arrive at the start and stop gear ratios.

According to the exemplary embodiment, the control strategy provides a means for simultaneously changing the displacements of the variable displacement pump 18 and variable displacement motors 22 only when the desired gear ratio 72 and the commanded gear ratio 74 are both increasing or both decreasing. Specifically, as shown in FIG. 3, the method selects a smaller rate of the desired gear ratio rate of change and the commanded gear ratio change. Thus, if one of the rates is zero, zero will be identified as the smaller rate and no overlap, or minimal overlap, will be effected. For example, if the operator does not command a gear ratio change (i.e., the desired gear ratio is zero) and the machine 10 drives into a pile that causes the hydrostatic drive system 14 to slow (i.e., the commanded gear ratio decreases), no overlap, or minimal overlap, will occur.

It should be appreciated that the method described herein is provided to describe an exemplary control strategy and, thus, implementation details may vary greatly depending on the particular application. Further, it should be appreciated that specific values provided herein, such as values corresponding to the start and stop overlap displacement factors, are provided for exemplary purposes only. Such values may be arrived at through testing and, further, may be selected to provide desired performance characteristics. For example, the control strategy provided herein may effect smoother transitions to different gear ratios, particularly at higher gear ratio rates of change.

INDUSTRIAL APPLICABILITY

The present disclosure finds potential application in any machine that utilizes a hydrostatic drive system. Further, the disclosure may be specifically applicable to hydrostatic drive machines utilizing one or more variable displacement pumps configured to drive one or more variable displacement motors. Yet further, the present disclosure may be applicable to control strategies for changing gear ratios in hydrostatic drive machines. Such machines may include, but are not limited to, off-highway machines, such as wheel loaders, and other machines known in the art.

Referring generally to FIGS. 1-6, a hydrostatic drive machine 10 may include a hydrostatic drive system 14 including at least one variable displacement pump 18 mechanically coupled to an internal combustion engine 20. The variable displacement pump 18 may be fluidly coupled to a pair of variable displacement motors 22, which, in turn, are drivingly coupled with ground engaging elements 16 of the machine 10 via a gear mechanism 51 and differential 53. A control system 50, including at least one electronic controller 56, may be provided for controlling operation of the hydrostatic drive system 14, including executing a method for controlling a gear ratio change in the hydrostatic drive machine 10.

During typical operation of the hydrostatic drive machine 10, the operator may move one or more machine operation controllers 30 to indicate a desired change from a current gear ratio to a new gear ratio. In response, and according to the strategy described herein, the electronic controller 56 may determine a gear ratio rate of change corresponding to the requested change in gear ratio. According to some embodiments this may be the smaller rate of a desired gear ratio rate of change and a commanded gear ratio rate of change. Start and stop overlap gear ratios defining an overlap range may be determined in the following manner. Specifically, a start overlap pump displacement factor 102 corresponding to the gear ratio rate of change 106 may be selected from an overlap displacement factors map 100 and multiplied by a maximum pump displacement value to arrive at a start of overlap pump displacement. A stop overlap motor displacement factor 104 corresponding to the gear ratio rate of change 106 may also be selected from the overlap displacement factors map 100 and multiplied by a maximum motor displacement value to arrive at an end of overlap motor displacement. The start of overlap pump displacement defines a start overlap gear ratio at which to begin an overlap, while the end of overlap motor displacement defines s stop overlap gear ratio at which to stop the overlap. Together, the start and stop overlap gear ratios define an overlap range. The electronic controller 56 may effect a change from the current gear ratio to the new gear ratio by simultaneously changing displacements of the variable displacement pump 18 and variable displacement motors 22 at gear ratios within the overlap range. Displacements of the variable displacement pump 18 and variable displacement motors 22 may be sequentially changed at gear ratios outside the overlap range.

According to a conventional increase in gear ratio from a stationary position, the pump displacement is stroked from zero displacement to maximum displacement while the motor displacement is maintained at maximum displacement. Then, to further increase gear ratio, the motor displacement is stroked from maximum displacement to zero displacement. These sequential displacement changes may result in performance deficiencies, particularly at a crossover gear ratio where the pump displacement changes end and the motor displacement changes begin. For example, when quickly transitioning across the crossover gear ratio, the hydrostatic drive system may not be capable of such quick transitions and, as a result, the machine may jerk or lug. This sacrifice of smoothness for speed may result in a reduction of efficiency caused by, for example, discomfort and fatigue of the operator and/or spilling a portion of the load.

The strategy provided herein for effecting simultaneous displacement changes balances quick responsiveness of the hydrostatic drive system with smoothness in transitions of the hydrostatic drive system. As described above, the start and stop overlap gear ratios, which may be determined using the displacement factors described above, may define overlap gear ratio ranges that increase as the gear ratio rate of change increases. Such values may be arrived at through testing and, further, may be selected to provide desired performance characteristics, such as those described above. For example, the control strategy provided herein may effect smoother transitions to different gear ratios, particularly at higher gear ratio rates of change.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

The invention claimed is:

1. A method of controlling a gear ratio change in a hydrostatic drive machine, wherein the hydrostatic drive machine includes a variable displacement pump and at least one variable displacement motor fluidly connected with the variable displacement pump, the method comprising steps of:
   determining a gear ratio rate of change corresponding to a change from a current gear ratio to a new gear ratio;
   determining start and stop overlap gear ratios corresponding to the gear ratio rate of change, wherein the start and stop overlap gear ratios define an overlap range; and
   changing from the current gear ratio to the new gear ratio using electronic signals at least in part by simultaneously changing displacements of the variable displacement pump and the at least one variable displacement motor at gear ratios within the overlap range, and sequentially changing displacements of the variable displacement pump and the at least one variable displacement motor at gear ratios outside the overlap range.

2. The method of claim 1, further including simultaneously changing the displacements of the variable displacement pump and the at least one variable displacement motor only when a desired gear ratio and a commanded gear ratio are both increasing or are both decreasing.

3. The method of claim 1, wherein the step of determining the gear ratio rate of change includes identifying the gear ratio rate of change as a smaller rate of a desired gear ratio rate of change and a commanded gear ratio rate of change.

4. The method of claim 1, further including identifying a start of overlap pump displacement as the start overlap gear ratio, and identifying an end of overlap motor displacement as the stop overlap gear ratio.

5. The method of claim 4, further including calculating the start of overlap pump displacement by multiplying a maximum pump displacement by a start overlap pump displacement factor, and calculating the end of overlap motor displacement by multiplying a maximum motor displacement by a stop overlap motor displacement factor.

6. The method of claim 5, further including selecting the start overlap pump displacement factor and the stop overlap motor displacement factor corresponding to the gear ratio rate of change from an overlap displacement factors map.

7. The method of claim 6, further including providing start overlap pump displacement factors and stop overlap motor displacement factors in the overlap displacement factors map that define overlap ranges that increase as the gear ratio rate of change increases.

8. The method of claim 1, wherein changing from the current gear ratio to the new gear ratio includes adjusting the variable displacement pump between a positive orientation and a negative orientation.

9. A hydrostatic drive machine, comprising:
a machine frame;
ground engaging propulsion elements coupled with the machine frame;
an internal combustion engine supported on the machine frame;
a variable displacement pump coupled with the internal combustion engine;
at least one variable displacement motor fluidly connected with the variable displacement pump, wherein the at least one variable displacement motor drives the ground engaging propulsion elements; and
an electronic controller in communication with the variable displacement pump and the at least one variable displacement motor, wherein the electronic controller determines a gear ratio rate of change corresponding to a change from a current gear ratio to a new gear ratio, determines start and stop overlap gear ratios corresponding to the gear ratio rate of change, wherein the start and stop overlap gear ratios define an overlap range, and changes from the current gear ratio to the new gear ratio using electronic signals at least in part by simultaneously changing displacements of the variable displacement pump and the at least one variable displacement motor at gear ratios within the overlap range, and sequentially changing displacements of the variable displacement pump and the at least one variable displacement motor at gear ratios outside the overlap range.

10. The hydrostatic drive machine of claim 9, wherein the electronic controller simultaneously changes the displacements of the variable displacement pump and the at least one variable displacement motor only when a desired gear ratio and a commanded gear ratio are both increasing or are both decreasing.

11. The hydrostatic drive machine of claim 9, wherein the electronic controller identifies the gear ratio rate of change as a smaller rate of a desired gear ratio rate of change and a commanded gear ratio rate of change.

12. The hydrostatic drive machine of claim 9, wherein the electronic controller identifies a start of overlap pump displacement as the start overlap gear ratio, and identifies an end of overlap motor displacement as the stop overlap gear ratio.

13. The hydrostatic drive machine of claim 12, wherein the electronic controller calculates the start of overlap pump displacement by multiplying a maximum pump displacement by a start overlap pump displacement factor, and calculates the end of overlap motor displacement by multiplying a maximum motor displacement by a stop overlap motor displacement factor.

14. The hydrostatic drive machine of claim 13, further including a memory storing an overlap displacement factors map mapping displacement factors to gear ratio rates of change, wherein the electronic controller selects the start overlap pump displacement factor and the stop overlap motor displacement factor corresponding to the gear ratio rate of change from the overlap displacement factors map.

15. The hydrostatic drive machine of claim 14, wherein the overlap displacement factors map includes start overlap pump displacement factors and stop overlap motor displacement factors that define overlap ranges that increase as the gear ratio rate of change increases.

16. The hydrostatic drive machine of claim 9, wherein the electronic controller adjusts the variable displacement pump between a positive orientation and a negative orientation.

* * * * *